United States Patent
De Salas et al.

(10) Patent No.: US 7,256,732 B2
(45) Date of Patent: Aug. 14, 2007

(54) METHOD AND APPARATUS FOR LOCATION-BASED TRIGGERING IN AN ASSISTED SATELLITE POSITIONING SYSTEM

(75) Inventors: Javier De Salas, Madrid (ES); Frank van Diggelen, San Jose, CA (US); Brendan Ludden, Düsseldorf (DE)

(73) Assignee: Global Locate, Inc, San Jose, CA (US)

( * ) Notice: Subject to any disclaimer, the term of this patent is extended or adjusted under 35 U.S.C. 154(b) by 326 days.

(21) Appl. No.: 10/884,424

(22) Filed: Jul. 1, 2004

(65) Prior Publication Data

US 2006/0001570 A1    Jan. 5, 2006

(51) Int. Cl.
 *G01S 5/14* (2006.01)
(52) U.S. Cl. .............................. 342/357.07; 342/357.17
(58) Field of Classification Search ........... 342/357.07, 342/357.08, 357.09, 357.17
See application file for complete search history.

(56) References Cited

U.S. PATENT DOCUMENTS

| | | | | |
|---|---|---|---|---|
| 5,550,551 | A | * | 8/1996 | Alesio .......................... 342/457 |
| 5,949,350 | A | * | 9/1999 | Girard et al. ........... 340/825.49 |
| 6,327,471 | B1 | * | 12/2001 | Song .......................... 455/440 |
| 6,411,892 | B1 | * | 6/2002 | van Diggelen .............. 701/207 |
| 6,421,001 | B1 | * | 7/2002 | Durst et al. ............ 342/357.07 |
| 6,453,237 | B1 | * | 9/2002 | Fuchs et al. ................. 701/213 |
| 6,556,819 | B2 | * | 4/2003 | Irvin .......................... 455/410 |
| 6,665,613 | B2 | * | 12/2003 | Duvall ........................ 701/213 |
| 6,832,093 | B1 | * | 12/2004 | Ranta ....................... 455/456.4 |
| 6,856,807 | B1 | * | 2/2005 | Raith ....................... 455/456.1 |
| 6,937,865 | B1 | * | 8/2005 | Bloebaum et al. ....... 455/456.1 |
| 2003/0052817 | A1 | * | 3/2003 | Diggelen ............... 342/357.09 |
| 2005/0034683 | A1 | * | 2/2005 | Giunta ........................ 119/721 |

OTHER PUBLICATIONS

International Search Report mailed Dec. 4, 2006 for PCT Application No. PCT/US05/22956.
Written Opinion mailed Dec. 4, 2006 for PCT Application No. PCT/US05/22956.

* cited by examiner

*Primary Examiner*—Gregory C. Issing
(74) *Attorney, Agent, or Firm*—Moser IP Law Group

(57) ABSTRACT

Method and apparatus for location-based triggering in a mobile receiver is described. In one example, a triggering region is designated. Expected pseudorange data is generated within the mobile receiver and pseudoranges to a plurality of satellites are measured. A delta position is computed with respect to a virtual center of the triggering region using satellite trajectory data, the measured pseudoranges, and the expected pseudoranges. The delta position is compared with the radius restriction value, the results of which may be used to trigger an event. In another example, expected pseudorange data is obtained at the mobile receiver. Pseudoranges from the mobile receiver to a plurality of satellites are measured. The measured pseudoranges and expected pseudoranges are compared using a metric to produce delta values. The delta values are compared with a radius restriction value, the results of which may be used to trigger an event.

34 Claims, 5 Drawing Sheets

METHOD AND APPARATUS FOR LOCATION-BASED TRIGGERING IN AN ASSISTED SATELLITE POSITIONING SYSTEM

BACKGROUND OF THE INVENTION

1. Field of the Invention

The present invention generally relates to satellite position location systems and, more particularly, to a method and apparatus for location-based triggering in an assisted satellite positioning system (SPS).

2. Description of the Background Art

Location-based triggering refers to instances where the geographical position of a mobile device triggers a predetermined event. For example, an event may be triggered when a mobile device enters or leaves a predefined area. The event may be local to the mobile device (e.g., an alarm), or may be linked to a network with which the mobile device communicates (e.g., a change in billing rates in a cellular telephone network). One practical application of location-based triggering technology is "home zone billing". More specifically, home zone billing is a feature that may enable a cellular phone service to compete with landline telephone service providers by charging customers reduced rates when they use their cellular phone, in lieu of their traditional telephone, while they are at home (i.e., the predefined area or zone).

One implementation of location-based triggering requires a network to continuously monitor a predefined area in order to determine if the mobile device remains at home throughout the duration of a call. The geographical position may be determined using a position location system, such as a satellite position location system (e.g., the Global Positioning System (GPS)). Although this method can be readily implemented, it requires the network to frequently update the position of the user. Such continuous updating, however, results in frequent and excessive use of valuable network resources.

Another implementation of location-based triggering that is aimed toward restricting the number of communications between the network and the mobile device utilizes a cell-site identifier ("cell ID") as the basis for a positioning method. The mobile device monitors the ID of the serving cell-site (e.g., base station) and triggers an event when a change in the serving cell is detected. Such a technique, however, lacks the desired accuracy and precision required for some applications (e.g., home zone billing). Furthermore, such a technique may also encounter problems pertaining to boundary conditions in situations where the predefined area includes the boundaries of several cell-sites.

Therefore, there is a need in the art for a method and apparatus that can perform location-based triggering with greater accuracy and reliability.

SUMMARY OF THE INVENTION

The invention provides a method and apparatus for location-based triggering in a mobile receiver. In one embodiment, a triggering region is designated. Once the triggering region has been established, satellite trajectory data is obtained by the mobile receiver. In one embodiment, the satellite trajectory data comprises Almanac data. Expected pseudorange data is subsequently generated in response to a virtual center in the triggering region and the satellite trajectory data. Afterwards, the pseudoranges from the mobile receiver to a plurality of satellites are measured. The mobile receiver then computes a delta position with respect to the virtual center using the satellite trajectory data, the measured pseudoranges, and the expected pseudoranges. This computed delta position defines the distance between the virtual center and the mobile receiver. The delta position is then compared with a radius restriction value in order to determine whether the mobile device has entered, departed, or remained within the triggering region depending on its relative position to the virtual center. An event may be triggered based on the results of the comparison.

In another embodiment of the invention, a triggering region is designated. After the triggering region has been determined, expected pseudorange data is obtained at a mobile receiver from the network. Pseudoranges from the mobile receiver to a plurality of satellites are measured. Next, the measured pseudoranges and expected pseudoranges are compared using a metric to produce delta values. The delta values are compared with a radius restriction value. An event may be triggered based on the results of the comparison.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

A method and apparatus for location-based triggering in an assisted satellite positioning system (SPS) is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing SPS satellite signals.

Figure 1:
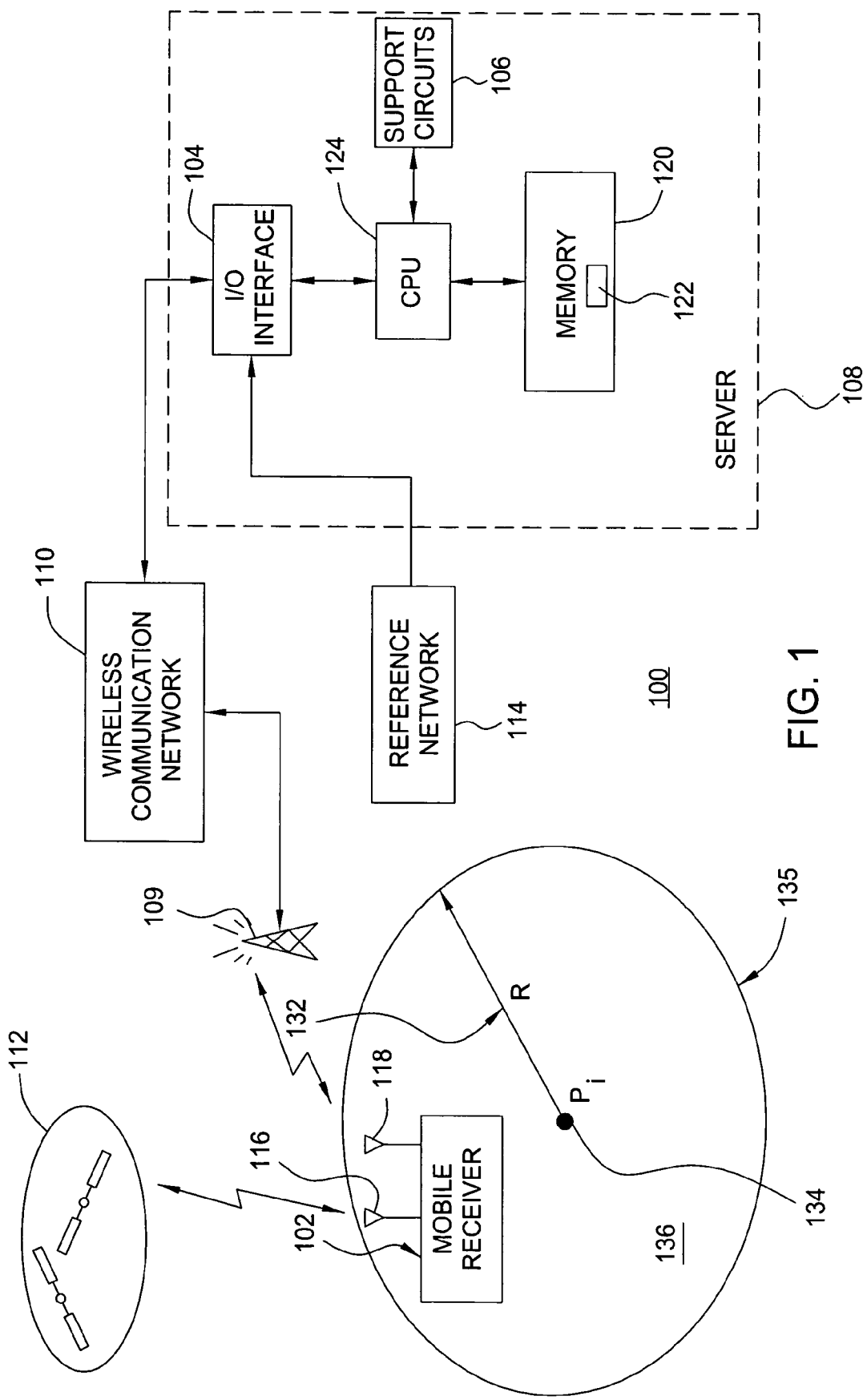
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. The mobile receiver 102 is configured for communication with the server 108 over a communication link between an antenna 118 and a base station 109 of the wireless communication network 110. The wireless communication network 110 may comprise a cellular communication network having a plurality of base stations or cell sites, including the base station 109. The server 108 may be disposed in a serving mobile location center (SMLC) of the wireless communication network 110. The mobile receiver 102 is configured to receive satellite signals from a plurality of satellites 112 via an antenna 116. The mobile receiver 102 processes the received satellite signals to produce satellite measurement data (e.g., pseudoranges, Doppler measurements).

The mobile receiver 102 is illustratively shown within a triggering region 136. In one embodiment, the triggering region 136 is defined by a virtual center 134 and a radius restriction value 132. The mobile receiver 102 is configured to test whether the user has crossed a boundary 135 of the triggering region 136. An event is triggered if the mobile receiver 102 crosses the boundary 135. For example, an event may be triggered if the mobile receiver 102 moves from inside the triggering region 136 to a threshold distance outside the triggering region 136. Alternatively, an event may be triggered if the mobile receiver 102 moves from outside the triggering region 136 to a threshold distance inside the triggering region 136. As described below, the mobile receiver 102 is configured to test crossing of the boundary 135 without determining a precise absolute location. For purposes of clarity by example, the triggering region 136 is shown having the virtual center 134 and the radius restriction value 132. It is to be understood, however, that in other embodiments the triggering region 136 may be defined using a plurality of virtual centers and associated radius restriction values (e.g., a combination of circles). In such embodiments, the mobile receiver 102 is configured to test whether the user has crossed a boundary of each of the individual circles that comprise the triggering region. A determination may then be made as to whether the mobile receiver 102 has crossed the boundary of the triggering region.

The triggered event may be local, such as a display of an indicator by the mobile receiver 102 (e.g., an audible alarm, a visual indicator, etc.), global, such as a communication from the mobile receiver 102 to the server 108, or a combination of local and global actions. For purposes of clarity by example, only a single triggering region 136 is shown. It is to be understood, however, that a plurality of triggering regions may be defined having different virtual centers with the same or different radius restriction values.

The mobile receiver 102 may receive assistance data from the server 108. In one embodiment, the assistance data includes acquisition assistance data. For example, the mobile receiver 102 may request and receive acquisition assistance data from the server 108 and send satellite measurement data to the server 108 along with a time-tag. The server 108 then locates position of the mobile receiver 102 (referred to as the mobile station assisted or "MS-assisted" configuration). In some embodiments, the mobile receiver 102 computes its own acquisition assistance data given an approximate location and satellite trajectory data, such as Almanac data.

The acquisition assistance data may be computed using satellite trajectory data (e.g., ephemeris or other satellite trajectory model) and an approximate position of the mobile receiver 102. An approximate position of the mobile receiver 102 may be obtained using various position estimation techniques known in the art, including use of transitions between base stations of the wireless communication network 110, use of a last known location of the mobile receiver 102, use of a location of the base station 109 in communication with the mobile receiver 102, use of a location of the wireless communication network 110 as identified by a network ID, or use of a location of a cell site of the wireless communication network 110 in which the mobile receiver 102 is operating as identified by a cell ID.

The acquisition assistance data includes expected pseudorange data. In one embodiment of the invention, the acquisition assistance data includes expected pseudoranges from the satellites 112 to an assumed position of the mobile receiver 102 (approximate position) at an assumed time-of-day. In one embodiment, the expected pseudoranges are derived from a model that is valid over specified period of time ("pseudorange model"). The mobile receiver 102 may apply a time-of-day to the pseudorange model to extract appropriate expected pseudorange parameters. Exemplary processes for forming pseudorange models as acquisition assistance data are described in commonly-assigned U.S. Pat. No. 6,453,237, issued Sep. 17, 2002, which is incorporated by reference herein in its entirety.

In one embodiment, the acquisition assistance data may be formatted as described in ETSI TS 101 527 (3GPP TS 4.31), which is shown below in Table 1. Notably, the acquisition assistance data defined in 3GPP TS 4.31 may include a satellite vehicle identifier (SVID), zeroth and first order Doppler terms, a Doppler uncertainty, an expected code phase (e.g., sub-millisecond pseudorange), an integer code phase, a code phase search window, and expected azimuth and elevation data. The range of possible values and associated resolutions are shown for each of the parameters.

TABLE 1

| Parameter | Range | Resolution |
|---|---|---|
| SVID/PRNID | 1-64 (0-63) | n/a |
| Doppler ($0^{th}$ order term) | −5, 120 Hz to 5, 117.5 Hz | 2.5 Hz |
| Doppler ($1^{st}$ order term) | −1-0.5 | n/a |
| Doppler Uncertainty | 12.5 Hz-200 Hz [$2^{-n}$(200) Hz, n = 0-4] | n/a |
| Code Phase | 0-1022 chips | 1 chip |
| Integer Code Phase | 0-19 | 1 C/A period |
| GPS Bit number | 0-3 | n/a |
| Code Phase Search Window | 1-192 chips | n/a |
| Azimuth | 0-348.75 deg | 11.25 deg |
| Elevation | 0-78.75 deg | 11.25 deg |

Satellite trajectory data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The server 108 illustratively comprises an input/output (I/O) interface 104, a central processing unit (CPU) 124, support circuits 106, and a memory 120. The CPU 124 is coupled to the memory 120 and the support circuits 106. The memory 120 may be random access memory, read only memory, removable storage, hard disc storage, or any combination of such memory devices. The support circuits 106 include conventional cache, power supplies, clock circuits, data registers, I/O interfaces, and the like to facilitate operation of the server 108. The I/O interface 104 is configured to receive satellite navigation data from the reference network 114. The I/O interface 104 is also configured for communication with the wireless communication network 110. Various processes and methods described herein may be implemented using software 122 stored in the memory 120 for execution by the CPU 124. Alternatively, the server 108 may implement such processes and methods in hardware or a combination of software and hardware, including any number of processors independently executing various programs and dedicated hardware, such as application specific integrated circuits (ASICs), field programmable gate arrays (FPGAs), and the like.

Figure 2:
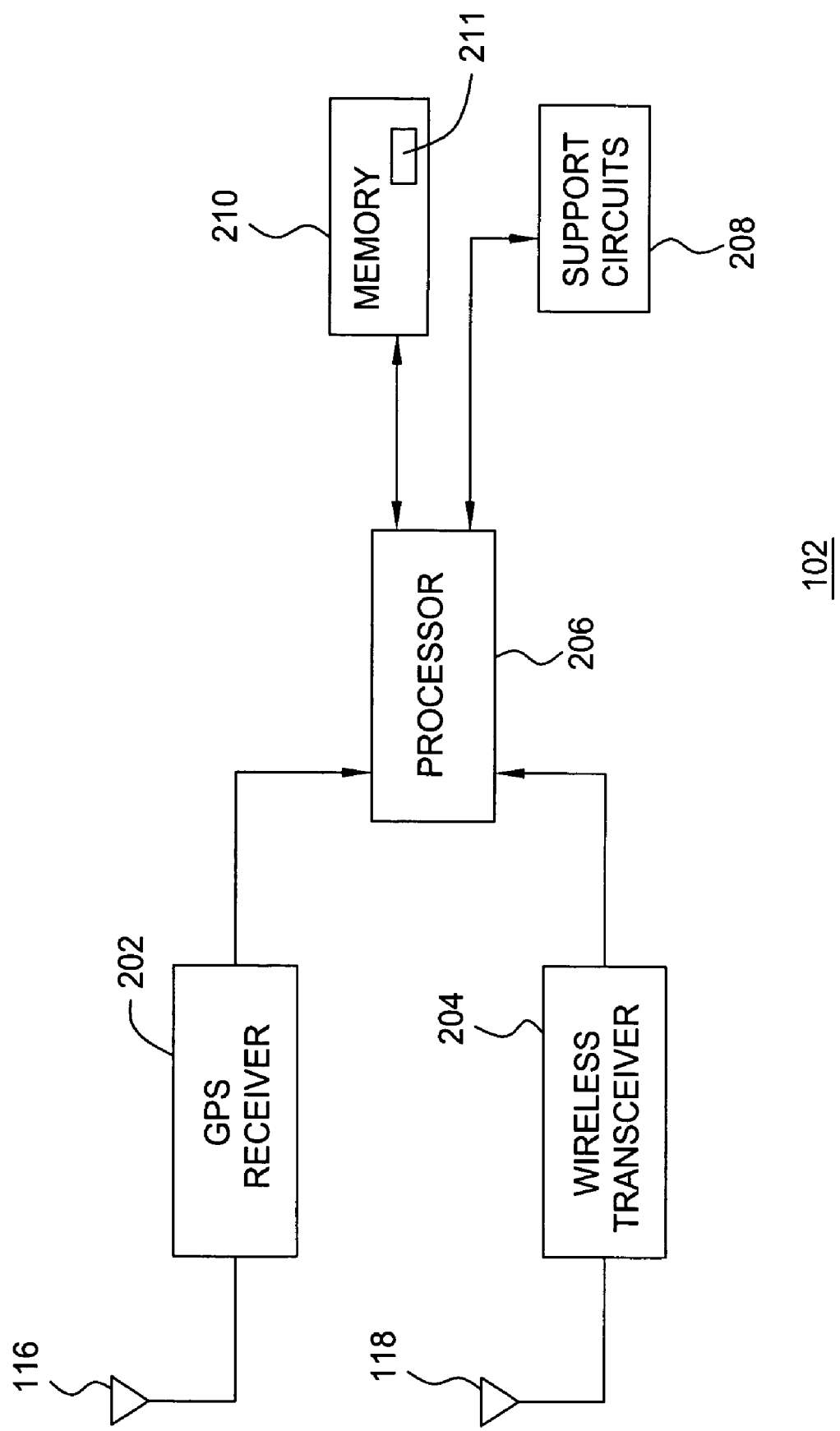
FIG. 2 is a block diagram depicting an exemplary embodiment of the GPS receiver of FIG. 1.

FIG. 2 is a block diagram depicting an exemplary embodiment of the mobile receiver 102 of FIG. 1. The mobile receiver 102 illustratively comprises a GPS receiver 202, a wireless transceiver 204, a processor 206, a memory 210, and support circuits 208. The GPS receiver 202 processes satellite signals received by the antenna 116. The GPS receiver 202 may comprise a conventional A-GPS receiver. The wireless transceiver 204 processes a wireless signal (e.g., a cellular signal) received by the antenna 118. The GPS receiver 202 and the wireless transceiver 204 are controlled by the processor 206.

The processor 206 may comprise a microprocessor, instruction-set processor (e.g., a microcontroller), or like type processing element known in the art. The processor 206 is coupled to the memory 210 and the support circuits 208. The memory 210 may be random access memory, read only memory, removable storage, hard disc storage, or any combination of such memory devices. The support circuits 208 include conventional cache, power supplies, clock circuits, data registers, I/O interfaces, and the like to facilitate operation of the mobile receiver 102. Various processes and methods described herein may be implemented using software 211 stored in the memory 210 for execution by the processor 206. Alternatively, the mobile receiver 102 may implement such processes and methods in hardware or a combination of software and hardware, including any number of processors independently executing various programs and dedicated hardware, such as ASICs, FPGAs, and the like.

Figure 3:
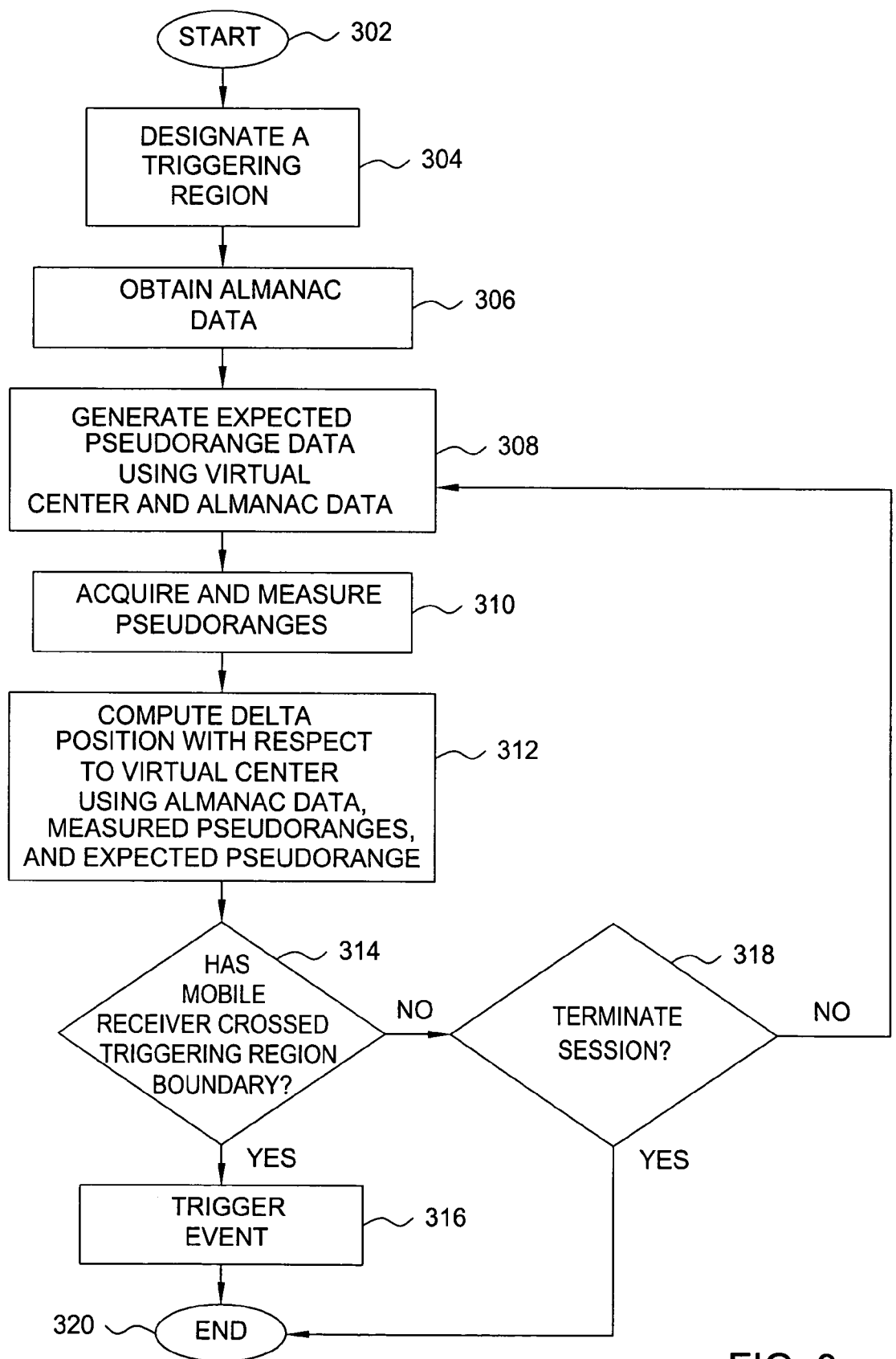
FIG. 3 is a flow diagram depicting an exemplary embodiment for location-based triggering in accordance with one or more aspects of the invention.

FIG. 3 is a flow diagram depicting an exemplary embodiment of a method 300 for location-based triggering in a mobile receiver in accordance with the invention. Aspects of the method 300 may be understood with simultaneous reference to the position location system 100 shown in FIG. 1. The method 300 commences at step 302. At step 304, a triggering region is designated (e.g., the triggering region 136). In one embodiment, the triggering region is defined by a virtual center and a radius restriction value. In one embodiment, the virtual center 134 of the triggering region 136 is a known location (e.g., a user's home). The radius restriction value 132 may be fixed with respect to the fixed virtual center 134 (e.g., a predefined area around a user's home) or may be dynamically adjusted over time. The radius restriction value 132 may be generated by the mobile receiver 102 or may be sent to the mobile receiver 102 from the server 108.

In another embodiment, the virtual center 134 of the triggering region 136 may be established dynamically based on an approximate location of the mobile receiver 102. In one embodiment, the mobile receiver 102 estimates its own approximate location. An exemplary process for establishing a virtual center of a triggering region within a mobile receiver 102 is described below with respect to FIG. 4. Alternatively, the server 108 may estimate the location of the mobile receiver 102 to establish the virtual center 134. In either embodiment, the radius restriction value 132 may be generated by the mobile receiver 102 or may be sent to the mobile receiver 102 from the server 108. An approximate location of the mobile receiver 102 may be estimated by either the mobile receiver 102 or the server 108 using various position estimation techniques known in the art, as described above.

At step 306, almanac data is obtained. As is well known in the art, almanac data or "almanac" comprises coarse satellite trajectory data valid for a period of months. The almanac data may be stored within the mobile receiver 102, and may be periodically refreshed by receiving updated almanac data from the server 108. While the invention is described with respect to use of almanac data, those skilled in the art will appreciated that other types of satellite trajectory data may be used, such as ephemeris data. Use of ephemeris data in place of almanac data, however, requires the mobile receiver 102 to receive more frequent updates, as ephemeris data is typically valid for only a few hours (e.g., four hours).

At step 308, expected pseudorange data is generated by the mobile receiver 102 using the virtual center 134 and the almanac data. The virtual center 134 is used as an approximate location of the mobile receiver 102 and the almanac data is used to provide approximate locations of overhead satellites at an approximate time-of-day. The expected pseudorange data is formed by computing the distance between the estimated satellite positions and the virtual center 134. An approximate time-of-day may be tracked using a clock in the mobile receiver 102 (e.g., a real-time clock), may be received from the wireless communication network 110, or may be computed by the mobile receiver 102 using acquisition assistance data from the server 108. An exemplary process for computing time-of-day using acquisition assistance data is described in commonly-assigned U.S. patent application Ser. No. 10/801,490, filed Mar. 16, 2004 (Attorney Docket no. GLBL 047), which is incorporated by reference herein in its entirety.

At step 310, pseudoranges from the mobile receiver 102 to a plurality of satellites 112 are measured. The process of acquiring satellite signals and measuring pseudoranges is well known in the art and is described in U.S. Pat. No. 6,453,237, incorporated by reference above. At step 312, a delta position with respect to the virtual center 134 is computed using the almanac data, the expected pseudoranges, and the measured pseudoranges. Notably, a mathematical model may be used that relates a residual difference between the measured pseudoranges and the expected pseudoranges to updates of position (e.g., x, y, and z position) and time (e.g., correlator clock bias ($t_c$) within the GPS receiver 104 and time-of-day error ($t_s$)). In one embodiment, the mathematical model may be defined as follows:

$$\underline{u} = \begin{bmatrix} u_1 \\ \vdots \\ u_n \end{bmatrix}$$

$$= \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

$$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= H\underline{x}$$

where: u is a vector of pseudorange residuals (the difference between the expected pseudoranges and the actual pseudoranges); and the H matrix contains the well known line-of-sight vectors (first three columns) relating the position updates (x,y,z) to the pseudorange residuals; a well known column of constants (c the speed of light) relating the correlator clock bias ($t_c$) to the pseudorange residuals; and a column of range rates relating the time-of-day error ($t_S$) to the pseudorange residuals. The H-matrix entries may be computed using the almanac data. For a detailed understanding of the above-described mathematical model, the reader is referred to commonly-assigned U.S. Pat. No. 6,734,821, issued May 11, 2004, which is incorporated by reference herein in its entirety. Although the mathematical model has been described with respect to updates for x, y, z, $t_c$, and $t_s$, it is to be understood that the mathematical model may be implemented to update any subset of such variables, as is described in U.S. Pat. No. 6,734,821.

The position updates computed using the mathematical model comprise a delta position with respect to the virtual center 134. At step 314, a determination is made as to whether the mobile receiver 102 has crossed the boundary of the designated triggering region. If so, the process 300 proceeds to step 316, where an event is triggered. Otherwise, the process 300 proceeds to step 318, where a determination is made as to whether the triggering session should be terminated. If so, the process ends at step 320. Otherwise, the process 300 returns to step 308 and repeats. In one embodiment, the process 300 may be repeated periodically with respect to a predefined polling interval until an event is triggered at step 316.

In one embodiment, at step 314, a determination is made as to whether the mobile receiver 102 has moved from inside the triggering region 136 to outside the triggering region 136. For example, the mobile receiver 102 may be deemed to have moved from inside the triggering region 136 to outside the triggering region 136 if the delta position exceeds the radius restriction value 132 by a threshold value. In another embodiment, at step 314, a determination is made as to whether the mobile receiver 102 has moved from outside the triggering region 136 to inside the triggering region 136. For example, the mobile receiver 102 may be deemed to have moved from outside the triggering region 136 to inside the triggering region 136 if the delta position is less than the radius restriction value 132 by a threshold value. In either embodiment, the threshold value may be used to establish a buffer zone around the boundary 135 of the triggering region 136 in order to avoid continuous event triggers when the mobile receiver 102 is near the boundary 135.

In another embodiment, the process 300 may be adapted for a triggering region having multiple virtual centers and radius restriction values. Notably, steps 308 through 312 may be repeated for each of the virtual center/radius restriction value pairs to compute multiple delta positions. A determination may be made at step 314 as to whether or not the mobile receiver 102 has crossed the boundary of the triggering region based on the results of multiple comparisons between the delta positions and respective radius restriction values.

In this manner, the invention provides the benefits of generating acquisition assistance data in the mobile receiver 102 and monitoring relative location of the mobile receiver 102 on a continual basis. The invention obviates the need for frequent and continuous communications between the mobile receiver 102 and the server 108.

Figure 4:
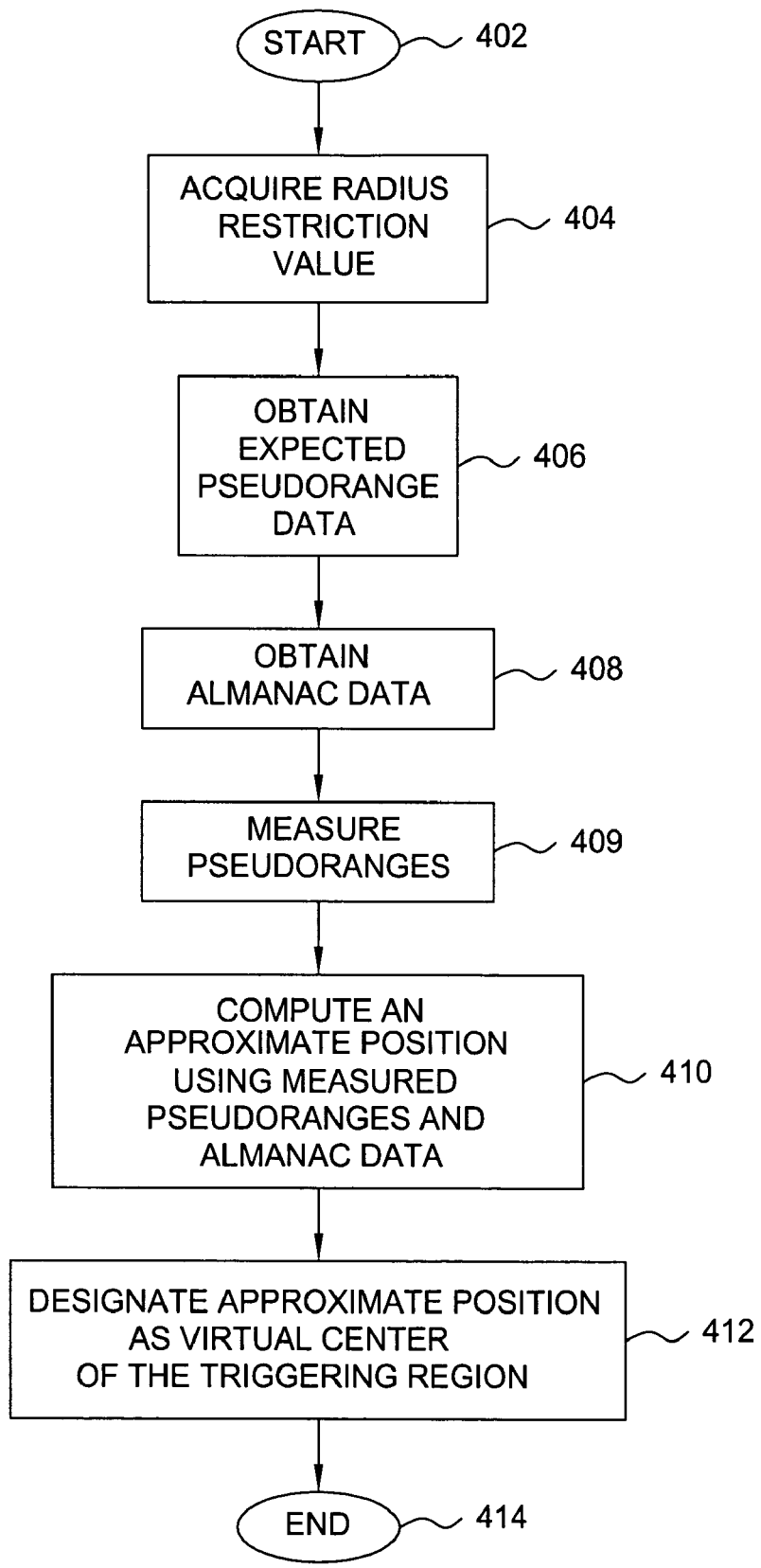
FIG. 4 is a flow diagram depicting an exemplary embodiment for designating a triggering region in accordance with the invention.

FIG. 4 is a flow diagram depicting an exemplary embodiment of a method 400 for designating a triggering region in accordance with the invention. Aspects of the method 400 may be understood with respect to the position location system 100 shown in FIG. 1. The method 400 begins at step 402. At step 404, the mobile receiver 102 acquires a radius restriction value (e.g., the radius restriction value 132). The radius restriction value 132 may be sent to the mobile receiver 102 from the server 108, or may be stored within the mobile receiver 102 (e.g., a fixed radius restriction value for each triggering region). At step 406, expected pseudoranges to a plurality of overhead satellites are then obtained by the mobile receiver 102 from the server 108. In one embodiment, the expected pseudoranges may be received via an acquisition assistance message transmitted from the server 108 (e.g., a GSM 4.31 acquisition assistance message, as described above).

At step 408, almanac data is obtained. As described above, the almanac data may be stored within the mobile receiver 102, and may be periodically refreshed by receiving updated almanac data from the server 108. While the method 400 is described with respect to use of almanac data, those skilled in the art will appreciated that other types of satellite trajectory data may be used, such as ephemeris data. Use of ephemeris data in place of almanac data, however, requires the mobile receiver 102 to receive more frequent updates, as ephemeris data is typically valid for only a few hours (e.g., four hours). At step 409, pseudoranges from the mobile receiver 102 to the plurality of satellites 112 are measured. At step 410, the mobile receiver 102 computes an approximate position using the measured pseudoranges, the expected pseudoranges, and the obtained almanac. The approximate position may be computed using the mathematical model, described above. Notably, if there is no provided initial position, the mathematical model may be applied with an initial position at the center of the earth and iterated until the updates converge. At step 412, the approximate position is designated as the virtual center 134 of the triggering region 136. The method 400 then ends at step 414.

Figure 5:
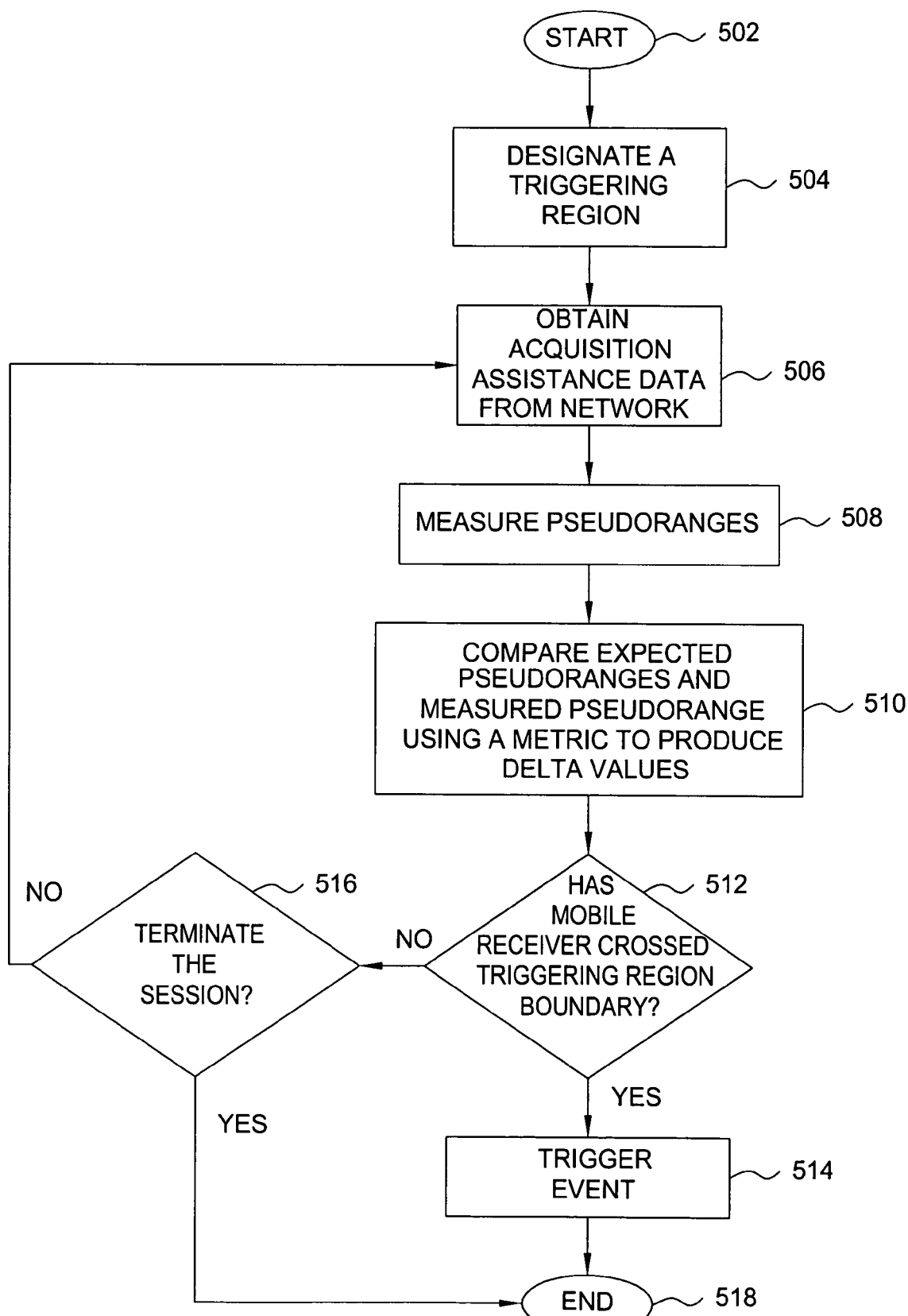
FIG. 5 is a flow diagram depicting another exemplary embodiment for location-based triggering in accordance with one or more aspects of the invention.

FIG. 5 is a flow diagram depicting another exemplary embodiment of a method 500 for location-based triggering in a mobile receiver 102 in accordance with the invention. The method 500 starts at step 502. At step 504, the method 500 designates a triggering region (e.g., triggering region 136). In one embodiment, the triggering region may be designated as described above with respect to the method 300 of FIG. 3. At step 506, the mobile receiver 102 obtains acquisition assistance data from the server 108. In one embodiment, the acquisition assistance data may include expected pseudoranges or expected pseudoranges and expected Doppler data. In one embodiment, the expected pseudoranges, as well as the expected Doppler data if required, may be received via an acquisition assistance message transmitted from the server 108 (e.g., a GSM 4.31 acquisition assistance message, as described above).

At step 508, pseudoranges from the mobile receiver 102 to a plurality of satellites 112 are measured. At step 510, the measured pseudoranges and the expected pseudoranges are compared using a metric to produce delta values. Exemplary embodiments of metrics that may be used are described below. At step 512, a determination is made as to whether the mobile receiver 102 has crossed the boundary of the designated triggering region. If so, the process 500 proceeds to step 514, where an event is triggered. Otherwise, the process 500 proceeds to step 516, where a determination is made as to whether the triggering session should be terminated. If so, the process 500 ends at step 518. Otherwise, the process 500 returns to step 506 and repeats. In one embodiment, the process 500 may be repeated periodically with respect to a predefined polling interval until an event is triggered at step 514.

In one embodiment, at step 512, a determination is made as to whether the mobile receiver 102 has moved from inside the triggering region 136 to outside the triggering region 136. For example, the mobile receiver 102 may be deemed to have moved from inside the triggering region 136 to outside the triggering region 136 if the absolute value of at least one of the delta values exceeds a function of the radius restriction 132 by a threshold distance. The function is based on the particular metric used at step 510, as described below. In another embodiment, at step 512, a determination is made as to whether the mobile receiver 102 has moved from outside the triggering region 136 to inside the triggering region 136. For example, the mobile receiver 102 may be deemed to have moved from outside the triggering region 136 to inside the triggering region 136 if the absolute value of at least one of the delta values is less than a function of the radius restriction 132 by a threshold distance. In either embodiment, the threshold distance value may be used to establish a buffer zone around the boundary 135 of the triggering region 136 in order to avoid continuous event triggers when the mobile receiver 102 is near the boundary 135.

In another embodiment, the process 500 may be adapted for a triggering region having multiple radius restriction values. Notably, the delta values computed at step 510 may be compared to multiple radius restriction values. A determination may be made at step 512 as to whether or not the mobile receiver 102 has crossed the boundary of the triggering region based on the results of multiple comparisons between the delta values and respective radius restriction values.

In one embodiment, the metric used at step 510 comprises a pseudorange residual operation. That is, differences between the measured pseudoranges and expected pseudoranges are computed (i.e., pseudorange residuals). Notably, for each satellite j, the pseudorange residual ($d_j$) is:

$$d_j = \rho_j - \rho_j^i$$

where $\rho_j$ is the $j^{th}$ measured pseudorange and $\rho_j^i$ is the $j^{th}$ expected pseudorange computed with respect to an initial position $P_i$ (e.g., the virtual center 134). If the mobile receiver 102 is located within the triggering region 136, then all the residuals calculated from a series of comparisons will be less (in magnitude) than the radius restriction value 132. If the mobile receiver 102 is positioned outside the triggering region 136, then one or more of the residuals will be greater than the radius restriction value 132. That is, a mobile receiver is in the triggering region 136 if $|\Delta d_j|<R$ for all j, where R is the radius restriction value 132. As discussed below, the pseudorange residual metric may only be used effectively if the mobile receiver 102 has knowledge of precise time such that common mode error in the measured pseudoranges may be compensated.

In another embodiment, the metric used at step 510 comprises a single difference operation. The single difference operation may be used to account for an unknown common mode error in the measured pseudoranges. As is well known in the art, the common mode error is an offset between the internal code phase generated by a correlator in the mobile receiver 102 and a received satellite signal. In addition, the common mode error affects all the measured pseudoranges by the same amount. Including common mode error, the pseudorange residual may be expressed as:

$$d_j = \rho_j - \rho_j^i + dt_c$$

It is apparent, for example, that a microsecond error on the local clock within the mobile receiver 102 will generate a 300 meter error in each pseudorange residual, unless the common mode error is compensated. Use of the single difference operation obviates the need to solve for common mode error and thus does not require knowledge of precise time.

More particularly, a single difference is formed for each pseudorange j by subtracting a reference pseudorange. Typically, the highest satellite is chosen as a reference satellite (although this is not a requirement) and the subscript 0 is used to denote a reference pseudorange. Thus, the measured reference pseudorange is $\rho_0$ and the expected reference pseudorange in the triggering region 136 is $\rho_0^i$. The single difference term is denoted by the delta symbol ($\Delta$) and is used below to signify the difference between $\rho_j$, which is the $j^{th}$ measured pseudorange, and $\rho_0$. This measured pseudorange single difference ($\Delta\rho_j$) may be expressed as:

$$\Delta\rho_j = \rho_j - \rho_0.$$

The expected pseudorange single difference ($\Delta\rho_j^i$) may be expressed as:

$$\Delta\rho_j^i = \rho_j^i - \rho_0^i.$$

Note that the single differences do not possess a common mode error, since such common mode error cancels exactly. A single difference comparison ($\Delta d_j$) may then be expressed as:

$$\Delta d_j = \Delta\rho_j - \Delta\rho_j^i$$

A mobile receiver is in the triggering region if $|\Delta d_j|<2R$ for all j. Please note that the function of the radius restriction is 2R, because the two terms, $\rho_j$ and $\rho_0$, can vary independently.

In addition to the common mode error, there is a second time discrepancy that affects the pseudorange residuals. This error is the absolute time error, defined as the difference between the absolute GPS time and the measurement time tag available at the mobile receiver 102. Although the absolute time error will not influence a measured pseudorange, it may affect expected pseudoranges. Notably, expected pseudoranges may be formed by taking an acquisition assistance message (e.g., a GSM 4.31 acquisition assistance message), which possesses a time tag "GPS TOW," and propagating the code phase with Doppler $0^{th}$ and 1st order terms. As an example, consider the formula that determines the expected pseudorange at a given time T:

Expected pseudorange at time T=code phase at $TOW$+Doppler*$(T-TOW)$+½ Doppler'*$(T-TOW)^2$ where "Doppler" is the $0^{th}$ order Doppler term from the acquisition assist message and "Doppler'" is the $1^{st}$ order Doppler term from the acquisition assist message. The Doppler and code phase variables are scaled to common units (e.g., chips, chips/s and chips/s$^2$; or m, m/s and m/s$^2$).

If the time, T, is in error by an amount dts (i.e., absolute time error), then the expected code phase will have an error amounting to the sum of:

Doppler*$dt_S$+½Doppler'*$dt_S^2$ where the Doppler values range from −800 to +800 m/s and the Doppler' values range from −0.15 to +0.06 m/s$^2$.

Therefore, an absolute time error ($dt_S$) of one second can lead to an expected pseudorange error of up to 800 meters in magnitude from the Doppler effect. In relation, only an error of up to 0.075 meters (½*0.15*1$^2$=0.075 m) in magnitude can be obtained from the Doppler' effect. Thus, this effect is insignificant in comparison to the Doppler effect and can be ignored. As an example, even if $dt_S$ had a value of 10 seconds, the Doppler effect could be as large as eight kilometers, yet the maximum Doppler' effect would only be 7.5 meters. Since $dt_S$ is typically found to be no greater than two seconds in practice, the Doppler' effect on the expected pseudorange error can be neglected for the remainder of this analysis. The expected pseudorange error can now be represented as:

Expected pseudorange error=Doppler*$dt_S$.

In yet another embodiment, the metric used at step 510 comprises a Doppler double difference operation. The Doppler double difference operation may be used to account for unknown errors in both local clock bias and absolute time. Including absolute time error ($dt_S$), the single difference comparison ($\Delta d_j$) described above may be expressed as:

$$\Delta d_j = \Delta \rho_j - \Delta \rho_j^i - (Doppler_j - Doppler_0)dt_S$$
$$= \Delta \rho_j - \Delta \rho_j^i - \Delta D_j dt_S$$

where $\Delta \rho_j$ is the measured pseudorange single difference for satellite j, $\Delta \rho_j^i$ is the expected pseudorange single difference for satellite j, and $Doppler_j$ and $Doppler_0$ are the Doppler terms for satellite j and the reference satellite, respectively. The symbol $\Delta D_j$ represents the difference between the two Doppler terms. Similarly, the single difference comparison for another satellite, $k(\Delta d_k)$ may be expressed as:

$$\Delta d_k = \Delta \rho_k - \Delta \rho_k^i - (Doppler_k - Doppler_0)dt_S$$
$$= \Delta \rho_k - \Delta \rho_k^i - \Delta D_k dt_S$$

where $\Delta \rho_k$ is the pseudorange single difference for satellite k, $\Delta \rho_k^i$ is the expected pseudorange single difference for satellite k, and $Doppler_k$ and $Doppler_0$ are the Doppler terms for satellite k and the reference satellite, respectively. The symbol $\Delta D_k$ represents the difference between the two Doppler terms.

The Doppler double difference (denoted by a Nabla ($\nabla$)) may then be expressed as follows:

$$\nabla \Delta d_{jk} := \Delta d_j - \Delta D_j / \Delta D_k \Delta d_k$$

where $\nabla \Delta d_{jk}$ is the Doppler double difference of the satellites j and k. This Doppler double difference is free of any error due to $dt_S$. This is demonstrated by expanding the right hand side of the above equation as follows:

$$\nabla \Delta d_{jk} := \Delta d_j - \Delta D_j / \Delta D_k \Delta d_k$$
$$= (\Delta \rho_j - \Delta \rho_j^i - \Delta D_j dt_S) - \Delta D_j / \Delta D_k (\Delta \rho_k - \Delta \rho_k^i - \Delta D_k dt_S)$$

Here it is apparent that the $dt_S$ terms cancel, leaving:

$$= (\Delta \rho_j - \Delta \rho_j^i) - \Delta D_j / \Delta D_j / \Delta D_k (\Delta \rho_k - \Delta \rho_k^i)$$

Next, values for j and k are selected so that $\Delta D_j/\Delta D_k \leq 1$. The mobile receiver 102 is in the triggering region if $|\nabla \Delta d_{jk}|<4R$ for all j. Note that the function of the radius restriction value is now 4R because four range terms now exist. However, the single difference reference satellite occurs twice (once in each term), and the second set of terms is weighted by $\Delta D_j/\Delta D_k \leq 1$. Thus, the 4R limit is a conservative restraint. Nonetheless, it provides a valid and necessary condition that can be utilized until a more restrictive bound is determined. For example, 4R could be replaced with $2R+|\Delta D_j/\Delta D_k|*2R$, which would provide more restrictive limits.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

What is claimed is:

1. A method of location-based triggering in a mobile receiver, comprising:
    designating a triggering region;
    obtaining satellite trajectory data;
    generating, from said satellite trajectory data, expected pseudorange data for a virtual center in said triggering region;
    measuring pseudoranges from said mobile receiver to a plurality of satellites;
    computing a delta position with respect to said virtual center using said satellite trajectory data, said measured pseudoranges, and said expected pseudorange data; and
    comparing said delta position with a radius restriction value associated with said virtual center.

2. The method of claim 1, further comprising:
repeating said steps of generating, measuring, computing, and comparing for one or more additional virtual centers in said triggering region having a respective one or more additional radius restriction values associated therewith.

3. The method of claim 1, further comprising:
triggering an event in response to said delta position exceeding said radius restriction value by a threshold distance.

4. The method of claim 3, wherein said event comprises at least one of a communication from said mobile receiver to a network and a display of an indicator by said mobile receiver.

5. The method of claim 1, further comprising:
triggering an event in response to said delta position being less than said radius restriction value by a threshold distance.

6. The method of claim 5, wherein said event comprises at least one of a communication from said mobile receiver to a network and a display of an indicator by said mobile receiver.

7. The method of claim 1, further comprising:
periodically repeating said steps of generating, measuring, computing, and comparing at a predefined polling interval.

8. The method of claim 1, wherein said step of designating said triggering region comprises:
receiving initial expected pseudorange data at said mobile receiver from a network;
measuring initial pseudoranges from said mobile receiver to an initial plurality of satellites;
computing an approximate position of said mobile receiver using said measured initial pseudoranges, said satellite trajectory data, and said initial expected pseudoranges; and
designating said approximate position as said virtual center in said triggering region.

9. The method of claim 8, wherein said expected pseudorange data is received via an acquisition assistance message from said network.

10. The method of claim 1, wherein said radius restriction value is obtained from a network in communication with said mobile receiver.

11. The method of claim 1, wherein said satellite trajectory data comprises almanac data.

12. The method of claim 11, further comprising:
obtaining said almanac data from a network in communication with said mobile receiver.

13. A method of location-based triggering in a mobile receiver, comprising:
designating a triggering region;
obtaining acquisition assistance data at said mobile receiver from a network, said acquisition assistance data including at least expected pseudoranges;
measuring pseudoranges from said mobile receiver to a plurality of satellites;
comparing said measured pseudoranges and said expected pseudoranges using a metric to produce delta values; and
comparing said delta values with a radius restriction value associated with said triggering region.

14. The method of claim 13, further comprising:
triggering an event in response to an absolute value of at least one of said delta values exceeding a function of said radius restriction value by a threshold distance.

15. The method of claim 14, wherein said event comprises at least one of a communication from said mobile receiver to said network and a display of an indicator by said mobile receiver.

16. The method of claim 13, further comprising:
triggering an event in response to an absolute value of each of said delta values being within a function of said radius restriction value by a threshold distance.

17. The method of claim 13, wherein said metric comprises a pseudorange residual operation.

18. The method of claim 13, wherein said metric comprises a single difference operation.

19. The method of claim 13, wherein said acquisition assistance data further includes Doppler data.

20. The method of claim 19, wherein said metric comprises a Doppler double difference operation.

21. The method of claim 13, further comprising:
periodically repeating said steps of obtaining, measuring, comparing said measured pseudoranges and said expected pseudoranges, and comparing said delta values with said radius restriction value at a predefined polling interval.

22. The method of claim 13, wherein said radius restriction value is obtained from said network.

23. A mobile receiver, comprising:
a memory for storing satellite trajectory data;
a satellite signal receiver for measuring pseudoranges from said mobile receiver to a plurality of satellites; and
a processor for generating expected pseudoranges, computing a delta position with respect to a virtual center of a triggering region using said satellite trajectory data, said measured pseudoranges, and said expected pseudoranges, and for comparing said delta position with a radius restriction value associated with said triggering region.

24. The mobile receiver of claim 23, wherein said processor is configured to trigger an event in response to said delta position exceeding said radius restriction value by a threshold distance.

25. The mobile receiver of claim 23, wherein said processor is configured to trigger an event in response to said delta position being within said radius restrictive value by a threshold distance.

26. The mobile receiver of claim 23, wherein said processor is configured to generate, from said trajectory data and in response to said virtual center, expected pseudorange data.

27. The mobile receiver of claim 23, further comprising:
a wireless transceiver for receiving said radius restriction value from a network.

28. A mobile receiver, comprising:
a wireless transceiver for receiving acquisition assistance data from a network, where said acquisition assistance data includes at least expected pseudoranges;
a satellite signal receiver for measuring pseudoranges from said mobile receiver to a plurality of satellites; and
a processor for comparing said measuring pseudoranges and said expected pseudoranges using a metric to produce delta values, and for comparing said delta values with a radius restriction value of a triggering region having a virtual center.

29. The mobile receiver of claim 28, wherein said processor is configured to trigger an event in response to an absolute value of at least one of said delta values exceeding a function of said radius restriction value by a threshold distance.

30. The mobile receiver of claim 28, wherein said processor is configured to trigger an event in response to an absolute value of at least one of said delta values being within a function of said radius restriction value by a threshold distance.

31. The mobile receiver of claim 28, wherein said metric comprises a pseudorange residual operation.

32. The mobile receiver of claim 28, wherein said metric comprises a single difference operation.

33. The mobile receiver of claim 28, wherein said acquisition data further includes Doppler data.

34. The mobile receiver of claim 33, wherein said metric comprises a Doppler double difference operation.

* * * * *